Figure 3:
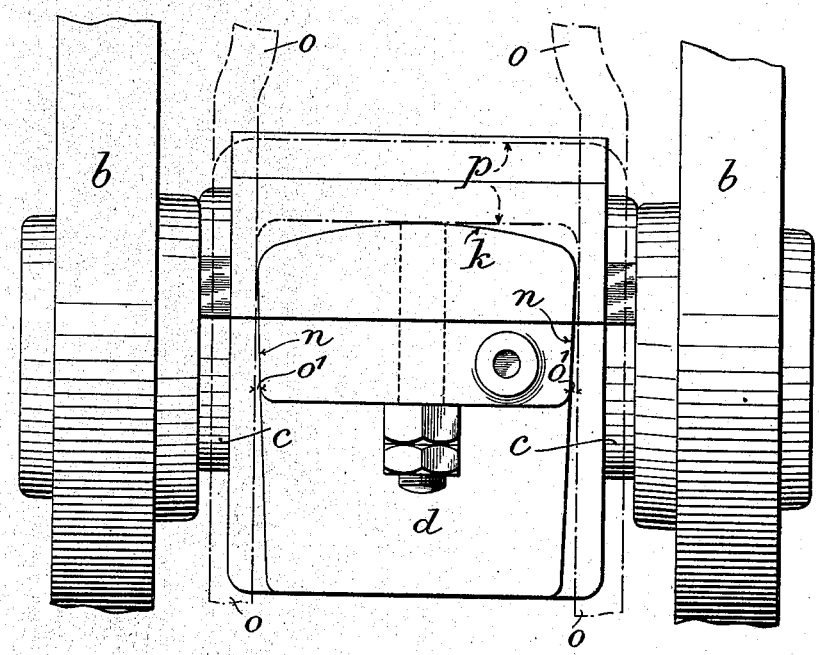

No. 885,801. PATENTED APR. 28, 1908.
A. SPENCER.
ANTIFRICTION MECHANISM FOR RAILWAY WAGONS AND OTHER VEHICLES.
APPLICATION FILED AUG. 2, 1907.
2 SHEETS—SHEET 1.
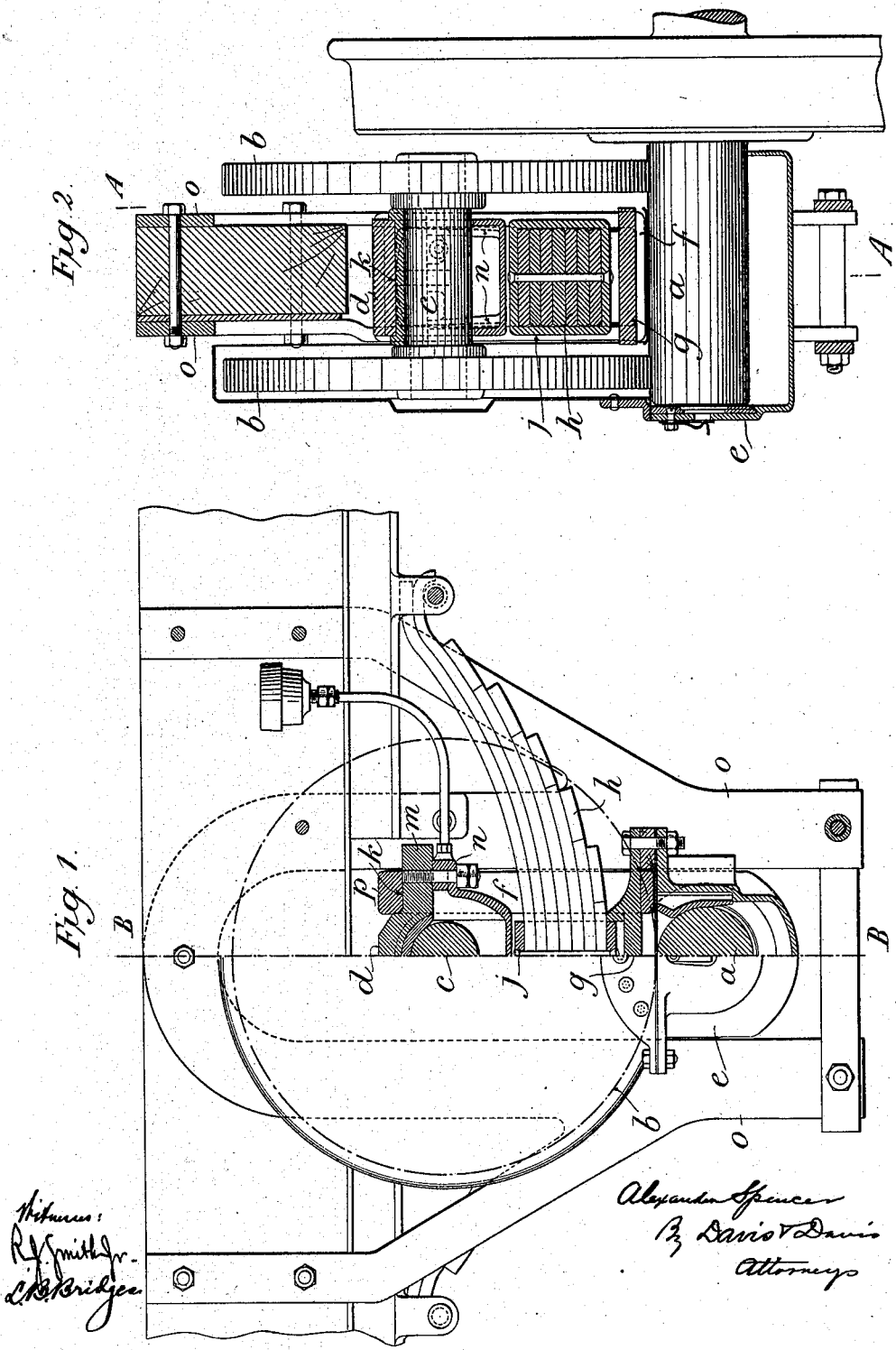

No. 885,801. PATENTED APR. 28, 1908.
A. SPENCER.
ANTIFRICTION MECHANISM FOR RAILWAY WAGONS AND OTHER VEHICLES.
APPLICATION FILED AUG. 2, 1907.

2 SHEETS—SHEET 2.

Witnesses.
W Henry Simms
E. Clough

Inventor.
Alexander Spencer.
per W Lloyd Wise
Attorney

UNITED STATES PATENT OFFICE.

ALEXANDER SPENCER, OF LONDON, ENGLAND.

ANTIFRICTION MECHANISM FOR RAILWAY-WAGONS AND OTHER VEHICLES.

No. 885,801.　　　　Specification of Letters Patent.　　　Patented April 28, 1908.

Application filed August 2, 1907. Serial No. 386,738.

*To all whom it may concern:*

Be it known that I, ALEXANDER SPENCER, a subject of the King of Great Britain and Ireland, residing at London, England, have invented Improvements in Antifriction Mechanism for Railway-Wagons and other Vehicles, of which the following is a specification.

This invention relates to antifriction mechanism for railway wagons and other vehicles, of the kind in which the load is transmitted to the running wheel axles through large antifriction wheels resting upon the end portions or journals of the running wheel axle.

In this kind of mechanism as heretofore usually constructed, for each running wheel journal two large antifriction wheels are arranged one at each side of the horn plates between which the corresponding bearing spring extends. The bearing box for the short axle of these antifriction wheels is formed with laterally projecting flanges which extend between strap plates, between which also extend laterally projecting flanges of the plate carrying the bearing spring with its buckle, these strap plates forming the connection with the guide or axle box of the running wheel axle. The end portions of the flanges of the bearing box clearly fit between the corresponding horn plates that guide the box in its vertical movements.

The construction and arrangement are such that the short axle of the pair of large antifriction wheels is firmly held against any tilting movement and when the running wheel journal assumes an inclined position, as is frequently the case when running, the bearing box of the antifriction wheel axle is jammed either between the strap plates or the horn plates, or both, and the short axle of the antifriction wheels is strained, the antifriction wheels running less freely than would otherwise be the case; the load moreover is no longer equal on each antifriction wheel of the pair.

Now this invention has for object to provide mechanism of this type in which this disadvantage is obviated. For this purpose the bearing box of the antifriction wheel axle is arranged to rock between the straps of the axle journal guide box and between the horn plates, relative lateral movement of bearing box, straps and horn plates, being prevented as heretofore.

Figure 1 of the accompanying illustrative drawings shows partly in front elevation and partly in vertical section corresponding to the line A, A of Fig. 2 one construction of mechanism of the type described, embodying this invention. Fig. 2 is an end elevation thereof partly in cross section corresponding to the line B, B of Fig. 1. Fig. 3 is a detail view hereinafter referred to.

$a$ is the journal of the running wheel axle of a railway wagon, $b, b$ the large antifriction wheels resting thereon, $c$ the short axle on which the wheels $b$ are mounted.

$d$ is the bearing box of the axle $c$, Fig. 2, the guide box of the journal $a$ and $f f$ the strap plates forming the abutment for the bearing box $d$ and the connection between it and the guide box $e$ through the plate $g$ which carries the bearing spring $h$ with its buckle $j$.

The upper sides $k$ of the lateral flanges $m$ of the bearing box $d$ are curved and the sides $n$ of the flanges $m$ taper off in a downward direction as shown in Fig. 3 which is a view of the box $d$ at a right angle to Fig. 1, so that while at their upper parts the flanges closely fit between the horn plates $o$, at their lower parts such clearance $o'$ is left at each side between the flanges and the horn plates that the bearing box $d$ can rock about the points of contact of the curved upper parts of the flanges with the straight undersides of the top members $p$ of the straps, clearance being left between the flanges $m$ and the side members of the straps, as shown, to permit of this movement.

As heretofore usual the bearing boxes $d$ may, as shown, be made in two pieces connected together by bolts passed through the lateral flanges $m$ thereof.

What I claim is:—

1. Antifriction mechanism for vehicles, comprising a wheeled axle having journals, antifriction wheels bearing upon said journals and means connecting said antifriction wheels to the vehicle and permitting said antifriction wheels to rock in relation to the vehicle so that the axes of the journals and the antifriction wheels will remain parallel.

2. In antifriction mechanism, a journal, a box for said journal, horn plates which guide said box, two relatively large antifriction wheels running on said journal one at each side of said horn plates, an axle on which said antifriction wheels are mounted, a bearing box for said axle guided by said horn plates, and an abutment for said bearing box connected to said journal box and against which said bearing box can rock.

3. In antifriction mechanism, a journal, a box for said journal, horn plates which guide said box, two relatively large antifriction wheels running on said journal one at each side of said horn plates, an axle on which said antifriction wheels are mounted, a bearing box for said axle guided by said horn plates, flanges on said bearing box extending between said horn plates, and an abutment for said bearing box connected to said journal box and against which said bearing box can rock.

4. In antifriction mechanism, a journal, a box for said journal, horn plates which guide said box, two relatively large antifriction wheels running on said journal one at each side of said horn plates, an axle on which said antifriction wheels are mounted, a bearing box for said axle guided by said horn plates, an abutment against which said bearing box can rock, and strap plates connecting said abutment to said journal box.

5. In antifriction mechanism, a journal, a box for said journal, horn plates which guide said box, two relatively large antifriction wheels running on said journal one at each side of said horn plates, an axle on which said antifriction wheels are mounted, a bearing box for said axle guided by said horn plates, flanges on said bearing box extending between said horn plates, an abutment against which said bearing box can rock, and strap plates connecting said abutment to said journal box.

6. In antifriction mechanism, a journal, a box for said journal, horn plates which guide said box, two relatively large antifriction wheels running on said journal one at each side of said horn plates, an axle on which said antifriction wheels are mounted, a bearing box for said axle guided by said horn plates, an abutment against which said bearing box can rock, strap plates connecting said abutment to said journal box, and flanges on said bearing box extending between said strap plates and said horn plates.

7. In antifriction mechanism, a journal, a box for said journal, horn plates which guide said box, two relatively large antifriction wheels running on said journal one at each side of said horn plates, an axle on which said antifriction wheels are mounted, a bearing box for said axle guided by said horn plates, an abutment against which said bearing box can rock, strap plates connecting said abutment to said journal box, and flanges on said bearing box extending between said strap plates and said horn plates, said flanges being curved at their upper sides where they bear on said abutment.

8. In antifriction mechanism, a journal, a box for said journal, horn plates which guide said box, two relatively large antifriction wheels running on said journal one at each side of said horn plates, an axle on which said antifriction wheels are mounted, a bearing box for said axle guided by said horn plates, an abutment against which said bearing box can rock, strap plates connecting said abutment to said journal box, and flanges on said bearing box extending between said strap plates and said horn plates, said flanges being curved at their upper sides where they bear on said abutment and the sides of which taper off in a downward direction.

Signed at 35. Queen Victoria street, in the city of London, England this seventeenth day of July 1907.

ALEXANDER SPENCER.

Witnesses:
TEMP L. T. COWELL,
JOSEPH WEBSTER.